July 6, 1926.

F. LAIRD

GATE LATCH

Filed Dec. 23, 1925

1,591,166

Inventor
Floyd Laird,
By Clarence A. O'Brien
Attorney

Patented July 6, 1926.

1,591,166

UNITED STATES PATENT OFFICE.

FLOYD LAIRD, OF JOSEPH, OREGON.

GATE LATCH.

Application filed December 23, 1925. Serial No. 77,349.

My present invention pertains to swingable farm gates, and more particularly to latch means therefor; and it contemplates the provision of a latch means of the type controllable by motor vehicles, and characterized by simplicity and inexpensiveness in construction, by the facility with which it is adapted to be applied to a swinging farm gate and a post complementary thereto, and by reliability in operation incident to both the latching and the unlatching of the gate.

Other objects and practical advantages of the invention will be fully understood from the following description and claims when the same are read in connection with the drawings, accompanying and forming part of this specification, in which:—

Figure 3:
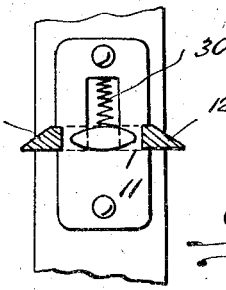
Figure 4:
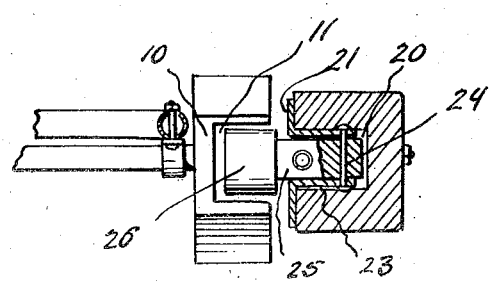

Figures 3 and 4 are enlarged detail sections taken in the planes indicated by the lines 3—3 and 4—4, respectively, of Figure 1 and illustrating features of my improvement hereinafter explicitly referred to.

Similar numerals of reference designate corresponding parts in all of the views of the drawings.

Figure 1:
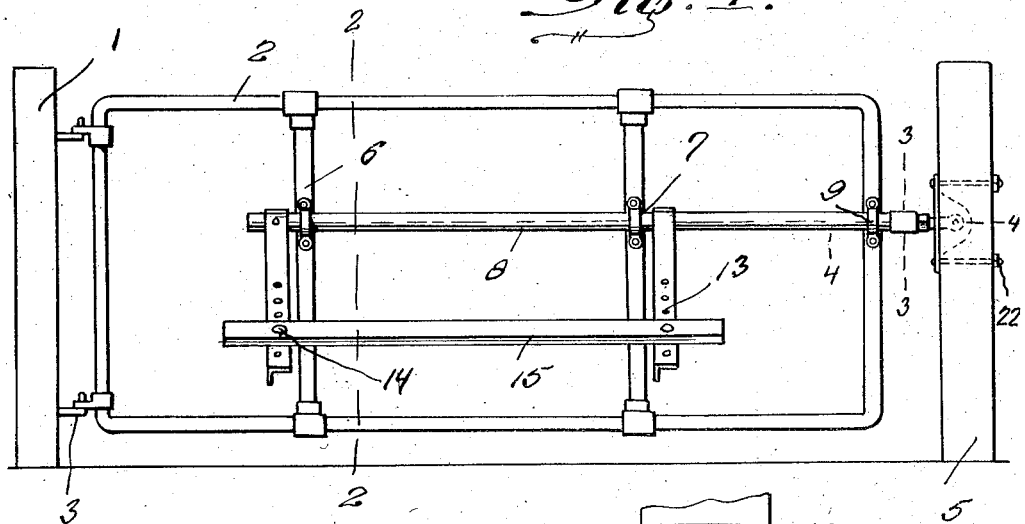
Figure 1 is a view illustrating in side elevation a gate and a gate post equipped with my improvement.
Figure 2:
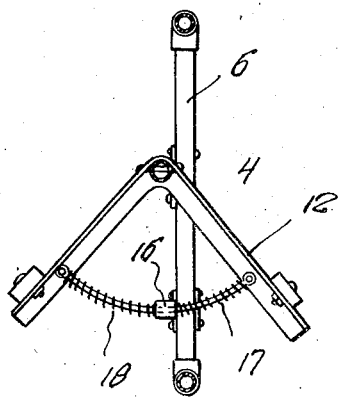
Figure 2 is a cross-section taken on the line 2—2 of Figure 1.

I show in Figure 1 a post 1 to which a gate 2 is hingedly connected in appropriate manner at 3 so as to enable the gate to swing in a horizontal plane; and I also show in Figures 1, 2 and 4 the automobile controlled member of my improvement, the said member being mounted to swing transversely of the gate and being operable or controlled by an automobile approaching either side of the gate. The said automobile controlled member is designated generally by 4. I also show in Figure 1 and Figures 3 and 4 a post 5 relatively arranged to the gate 2 for the purpose of carrying the post portion of my improvement.

The gate 2 is shown as having spaced uprights 6, and on said uprights 6 are mounted and secured bearing straps 7. Journaled in these bearing straps 7 is a longitudinal rock shaft 8 which extends through an auxiliary bearing strap 9 on the outer upright of the gate and beyond the outer end of the gate and is provided on its extended portion with a head 10. The said head 10 extends at opposite sides of the longitudinal vertical plane of the shaft 8 and is provided in longitudinal alinement with the shaft 8 with a recess 11, Figures 3 and 4, and is provided at opposite sides of the said recess 11 with beveled end portions 12.

Straddling and fixedly connected to the rock shaft 8 are inverted V-shaped members 12, the said members 12 being, by preference, of angle cross-section, and being provided, also by preference, with apertures 13 for the adjustable connection through the medium of bolts 14 of longitudinal bars 15 which are designed for the direct engagement of an automobile. It will also be understood by comparison of Figures 1 and 2 that one of the uprights 6 of the gate 2 is provided with an apertured abutment 16, and that an arcuate rod 17 extends loosely through said abutment and is connected at its ends to opposite arms of one of the V-shaped members 12. The said arcuate rod 17 carries two coiled springs 18, the said springs being wound about the rod and being interposed between opposite ends of the abutment 16 and the arms of the V-shaped member 12 alluded to.

Manifestly by virtue of the interposition of the coiled spring between the abutment 16 and the arms of the V-shaped member 12, the head 10 will be yieldingly maintained in and returned to a horizontal position.

The post 5 is recessed as designated by 20, and the post is equipped with a bracket 21 connected to the post by bolts 22 or other appropriate means, and having within the recess 20 upright spaced portions 23. Pivotally mounted at 24 between the said bracket portions 23 is the vertically swingable keeper member 25 of my improvement, the said keeper member having a shank and also having a head 26, and the latter being shaped in cross-section, as best shown in Figure 3, so as to cooperate in the manner hereinafter described with the head 10. The shank of the vertically swingable keeper member 25 normally rests on the bottom of the bracket 21 and is yieldably held against upward movement by a spring 30 interposed between the shank of the member 25 and the upper wall of the bracket or recess 20.

In the practical use of my improvement it will be understood that with the head 10 and the latch member 25 relatively arranged as shown in Figures 1, 3 and 4, the gate 2 will be held against swinging in either direction. When, however, an automobile approaches the gate from either side, the forward wheels of the automobile will operate against the adjacent bar 15 and thereby rock the shaft 8 about its axis so as to enable the head 10 on the continued movement of the gate through the medium of the automobile to clear the head of the keeper member 25. In the manner stated the gate is opened by an automobile, and it will also be understood that when the gate is released and swung in any approved manner to a closed position, the head 10 will ride past the head 26 of the latch member 25 until the parts are relatively arranged as shown in Figures 3 and 4 when the gate will be automatically and securely latched.

It will be apparent from the foregoing that my improvement is simple and inexpensive in construction and at the same time reliable in operation, and that the improvement does not greatly increase the cost of a gate or render the same unduly cumbersome.

I have entered into a detailed description of the construction and relative arrangement of the parts embraced in the present and preferred embodiment of my invention in order to impart a full, clear and exact understanding of the said embodiment. I do not desire, however, to be understood as limiting myself to the construction and relative arrangement of parts as disclosed, my invention being defined by my appended claims within the scope of which modifications may be made in structure and arrangement without departure from my invention.

Having described my invention, what I claim and desire to secure by Letters-Patent, is:—

1. In combination, a swinging gate, a recessed post, bearing straps on the gate, a rock shaft journaled in said straps and extending beyond the outer end of the gate and provided on its extended portion with a head disposed at right angles to the shaft and recessed in its forward side and provided at opposite sides of said recess with beveled portions, a vertically swingable keeper member mounted in and extended from the recess in the post and having on its extended portion a beveled head for cooperation with the head of the rock shaft, spring means normally and yieldingly maintaining said keeper member in horizontal position, members of inverted V-shape straddling and fixed with respect to the rock shaft, longitudinal bars carried by the arms of the V-shaped members and disposed at opposite sides of the gate, an apertured abutment carried by the gate, an arcuate rod arranged to play through the apertured abutment and connected at its ends to the arms of one V-shaped member, and coiled springs mounted on said rod and interposed between the arms of the V-shaped member and the abutment.

2. In combination, a swinging gate, a post, a vertically swingable keeper member carried by the post and having a beveled head, a longitudinal rock shaft carried by the gate and extending beyond the forward end or outer end of the gate and provided on its extended portion with a head disposed at right angles to the shaft and having a recess in its forward side and also having beveled portions at opposite sides of said recess, swingable means fixed with respect to and movable with the rock shaft and extending at opposite sides of the gate and provided at said opposite sides with longitudinal bars adapted for the contact of an automobile, and spring means arranged to cooperate with said swingable means for the yielding maintenance of the head on the rock shaft in substantial horizontal position.

3. In combination, a swinging gate, a post, a vertically swingable keeper member carried by the post and having a beveled head, a longitudinal rock shaft carried by the gate and extending beyond the forward end or outer end of the gate and provided on its extended portion with a head disposed at right angles to the shaft and having a recess in its forward side and also having beveled portions at opposite sides of said recess, swingable means fixed with respect to and movable with the rock shaft and extending at opposite sides of the gate and provided at said opposite sides with longitudinal bars adapted for the contact of an automobile, and spring means arranged to cooperate with said swingable means for the yielding maintenance of the head on the rock shaft in substantial horizontal position; the said swingable means comprising a member of V-shape inverted, an abutment carried by the gate and provided with an aperture, an arcuate rod arranged to play through said abutment and connected at its ends to the arms of said V-shaped member, and springs on the rod and interposed between said arms and said abutment.

4. In combination, a swinging gate, a post, a vertically swingable keeper member carried by the post and having a beveled head, a rock shaft carried by and extending beyond the outer end of the gate and provided on its outer portion with a head disposed at right angles to the rock shaft and provided with a recess in its forward side and also provided with beveled portions at opposite sides of said recess, and laterally movable means disposed at opposite sides of the gate and connected with the rock shaft for the rocking of said shaft by the contact of an automobile.

5. In combination, a swinging gate, a longitudinal rock shaft carried by the gate and extending beyond the outer portion or end thereof and provided on its extended portion with a head having a recess in its forward side and also having a beveled portion, laterally movable means alongside the gate and connected with the shaft for the rocking of the latter by the contacts of an automobile, a post, and a vertically swingable keeper member carried by the post and having a beveled head for cooperation with said head of the rock shaft.

In testimony whereof I affix my signature.

FLOYD LAIRD.